US006809266B1

(12) United States Patent
Hoi et al.

(10) Patent No.: US 6,809,266 B1
(45) Date of Patent: Oct. 26, 2004

(54) CABLE ORGANIZER

(75) Inventors: Chok-Meng Hoi, Changan (CN); Chih Jung Lee, Monterey Park, CA (US)

(73) Assignee: Lux Imports, Inc., Monterey Park, CA (US)

( * ) Notice: Subject to any disclaimer, the term of this patent is extended or adjusted under 35 U.S.C. 154(b) by 0 days.

(21) Appl. No.: 10/441,396

(22) Filed: May 19, 2003

(51) Int. Cl.$^7$ .................................................. H01B 7/00
(52) U.S. Cl. .................... 174/135; 174/72 A; 174/68.3; 385/135
(58) Field of Search .............................. 174/135, 72 A, 174/65 R, 68.1, 98, 93, 95, 70 C, 21 R, 24, 72 C, 68.3; 385/134, 135; 285/417, 68.1; 439/207; 248/68.1

(56) References Cited

U.S. PATENT DOCUMENTS

| | | | | |
|---|---|---|---|---|
| 5,600,098 A | * | 2/1997 | Kazaks | 174/135 |
| 5,849,379 A | * | 12/1998 | Gladfelter et al. | 428/35.8 |
| 6,078,009 A | * | 6/2000 | Kawamura | 174/68.3 |
| 6,429,378 B2 | * | 8/2002 | Shak | 174/135 |
| 6,653,568 B1 | * | 11/2003 | Davis | 174/68.3 |

* cited by examiner

Primary Examiner—Dean A. Reichard
Assistant Examiner—Angel R. Estrada
(74) Attorney, Agent, or Firm—Raymond Y. Chan; David and Raymond Patent Group

(57) ABSTRACT

A cable organizer for ease of managing cables includes a holding sleeve and a cable guide. The holding sleeve is shaped as an elongated tube with a first opening and a second opening. A receiving slit nonlinearly extends from the first opening to the second opening along the holding sleeve. The cable guider is composed of a pair of hinged opposing shells to form a conduit with an inlet and outlet through which the cables are so surrounding field in therein. When the cable organizer is in use, the cable guider slide along with the holding sleeve to widen the receiving slit in order to allow the cables being placed into the holding sleeve. Thereafter, the receiving slit returns to its original position and holds the cables therein, thereby achieving organization of cables.

25 Claims, 4 Drawing Sheets

CABLE ORGANIZER

BACKGROUND OF THE PRESENT INVENTION

1. Field of Invention

The present invention relates to an apparatus for organization of cables, and more particularly to a cable organizer having a tubular sleeve for gathering and receiving more then one cables therein along the length thereof.

2. Description of Related Arts

Organization of cables of computer systems and electronic and/or electrical appliances is a headache to everybody. For example, a personal computer contains a number of cables to connect monitors, power supplies and other peripherals such as printers, scanners, speakers, modems, keyboard, mouse, microphone, web cam, external hard drive, zip drive, rewritable CD/DVD Rom, and etc. All those cables are generally mixed up and entangled with each other that may not only cause unnecessary damage to the cables' isolating skins but also increase the risk of electric short due to the damaged or worn out cables. In addition, the intertwined cables appear as a nuisance to the neatness of their surroundings. Thus, it is desirable to have a device to organize the cables for safety concerns and to create a better sense of neatness.

One conventional solution to organize cables is to use a tape tying up all the cables together. The tape may be made of plastic or fabric, with or without automatic buckling mechanism. One or more tapes may be used to tie up the cables in order to achieve a better layout. However, the tied-up cables are still directly exposed to sharp objects that may cause damage to the isolating skin of the cables and result in electric short. The tape method is too troublesome and time consuming because the user has to hold the cables together in one hand and tie the tape around the cables a round after a round with his or her other hand. Also, if the user needs to move the computer and its peripherals or to add one or more cables, the user has to remove the tapes and re-tape the cables again.

Another conventional solution is to fit the cables into an elastic tube so that they can be held together for purposes of neatness and protection from direct exposure to sharp objects. When the elastic tube is in use, one needs to fit the electric plug of the cable into the tube first, and then woks the electric plug through the tube in order to place the whole cable along the tube. The process will be repeated as many times as all the cables are organized in the tube. Apparently, this solution does not work while the electric plug of a cable is plugged into a socket. Additionally, the use of the elastic tube is very time-consuming and inconvenient.

SUMMARY OF THE PRESENT INVENTION

A main objective of the present invention is to provide a cable organizer which can hold a number of cables in a tubular elongated holding sleeve to achieve the safety concern and a better sense of neatness.

Another objective of the present invention is to provide a cable organizer which can hold the cables received therein firmly in position and has a flexibility of even making a 360 degree bending with the cables therein.

Another objective of the present invention is to provide a cable organizer which elongated nonlinear receiving slit not only provides a flexibility of the holding sleeve but also can enhance its cable holding ability to prevent the cables enclosed therein from escaping easily.

Another objective of the present invention is to provide a cable organizer which enables the user to add a cable therein or to remove a cable therefrom anytime easily.

Another objective of the present invention is to provide a cable organizer wherein two or more holding sleeves are able to be used to enclose sections of the cables so as to cover the whole length of the cables.

Another objective of the present invention is to provide a cable organizer wherein two or more holding sleeves are capable of connecting end to end to achieve a predetermined length. Also, the holding sleeve can be cut to shorten its length.

Another objective of the present invention is to provide a cable organizer which cable guider can hold the bundle of cables together easily and guide them into the holding sleeve easily by simply running through the holding sleeve, so that the user has no need to use his or her hand to hold the cables and push the cables into the holding sleeve that substantially eases and speeds up the operation.

Another objective of the present invention is to provide a cable organizer which resilient arc-shaped holder arms will close up the cable channel immediately and automatically to receive the cables just running through the holding sleeve by means of the cable guider.

Another objective of the present invention is to provide a cable organizer which holding sleeve is a one-piece body without any connection of parts while the cable guider is a two-piece clamp body so that its manufacturing cost is relatively economic.

In order to accomplish the above objectives, the present invention provides a cable organizer which comprises an elongated holding sleeve having a first opening and a second opening and defining a cable channel extending between the first opening and the second opening, wherein a nonlinear receiving slit provides on a circumferential surface thereof and extends from the front opening to the rear opening along the length of the holding sleeve. When the cable organizer is in use, the receiving slit is flexibly widened to allow a portion of the cables being placed within the elongated tube. After the portion of the cables are placed into the tube, the receiving slit returns to its original shape so as to securely hold the cables along the receiving channel and protect the cables from exposure to sharp objects.

The cable organizer further comprises a cable guider including a tubular guiding holder, which is arranged to hold around a length portion of the cables and slide along the length of the cables, and a slit divider inclinedly extended from an inlet end of the tubular guiding holder to form an inserter head which is constructed to be able to insert in holding sleeve from one of the first and second openings thereof and slide through the cable channel to the other opening in such a manner that when the slit divider slides through the cable channel of the holding sleeve, the inlet end of the tubular guiding holder is positioned inside the cable channel. Therefore, when the tubular guiding holder slides from a previous length portion to a current length portion along the length of the cables while the slit divider is sliding through the cable channel, the previous length portion of the cables will be placed inside the cable channel of the holding sleeve so that the length of the cables which equals to the length of the holding sleeve can be easily placed inside the holding sleeve along the cable channel by simply running the slit divider of the cable guider through the cable channel of the holding sleeve.

Still further objects and advantages will become apparent from a consideration of the ensuing description and drawings.

These and other objectives, features, and advantages of the present invention will become apparent from the following detailed description, the accompanying drawings, and the appended claims.

BRIEF OF THE DRAWINGS

DETAILED DESCRIPTION OF THE PREFERRED EMBODIMENT

Figure 1:
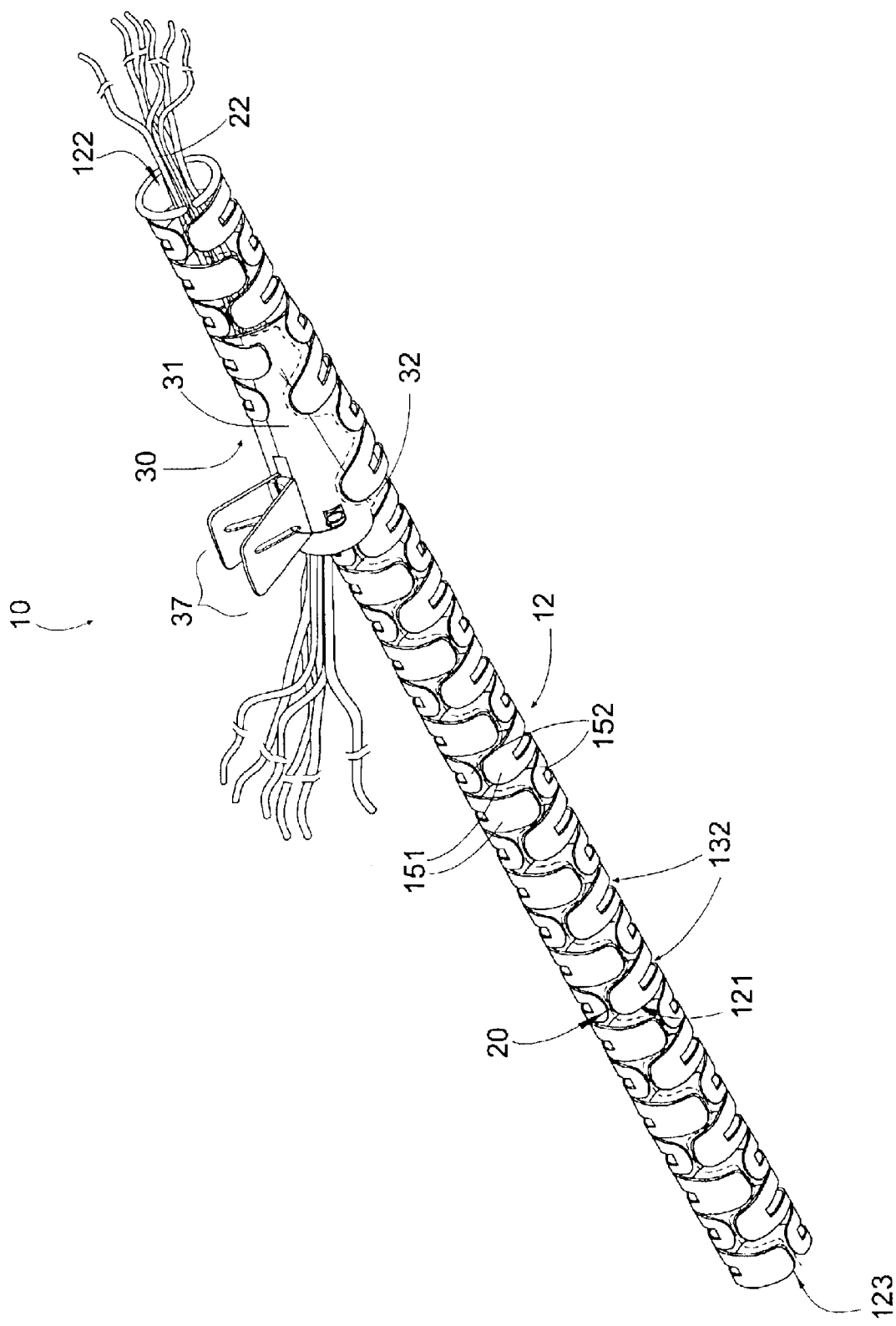
FIG. 1 is perspective view illustrating a cable organizer according to a preferred embodiment of the present invention while operating to place a bundle of cables therein.

Referring to FIGS. 1 to 4, a cable organizer 10 according to a preferred embodiment of the present invention is illustrated, wherein the cable organizer 10 comprises a holding sleeve 12 arranged to engage cables 22 therein by means of a cable guider 14, Referring to FIG. 1, the holding sleeve 12 comprises an elongated tubular body made of elastic material such as plastic or foam material, which has a first opening 122 at one end and a second opening 123 at the other end defining a cable channel 121 between the first and second openings 122 and 123. In order to provide a better flexibility of the holding sleeve 12, a first set of C-shaped slots 131 is spacedly and paraellelly along a front side of the holding sleeve 12 longitudinally and a second set of C-shaped slots 132 is formed spacedly and paraellelly along a back side of the holding sleeve 12 longitudinally, wherein the first and second sets of C-shaped slots 131, 132 are arranged intervally to maintain a whole and continuous body. The first and second sets of C-shaped slots 131 enable the holding sleeve 12 to bend as much as 360 degrees along its rear side and front side respectively, so that the holding sleeve 12 can be bent to fit any predetermined angle such the wall corners and desk side edges.

The holding sleeve 12 further has a nonlinear receiving slit 20 which is continuously extended from the first opening 122 to the second opening 123 and incorporated with the first set of C-shaped slots 131 to define a zigzag shape, illustrating as the dotted line in FIG. 1. Accordingly, between every two C-shaped slots 131 of the first set of the C-shaped slots 131, the holding sleeve 12 forms a pair of holder arms 151, 152, wherein one of the holder arms 151 is longer than the other holder arms 152.

By separating the long and short holder arms 151, 152, the size o f the c able channel 121 can be enlarged and the width of the zigzag shaped receiving slit 20 is flexibly widened to receive cables 22 into the holding sleeve 12. Then, since the holding sleeve 12 is preferably made of resilient materials, after the cables 22 are placed therein, the two holder arms 151, 152 can automatically return to their original position to close up the receiving slit 20 and the cable channel 121 immediately that prevents the cables 22 from escaping the confinement of the holding sleeve 12.

In order to assist the user to place the bundle of cables 22 into the cable channel 121 in an easier and more effective manner, the cable organizer 10 further comprises a cable guider 30 for gathering the bundle of cables 22 and inserting the bundle of cables 22 into the cable channel 121 by slidably running through the holding sleeve 12. A s shown in FIG. 2, the cable guider 30 includes a tubular guiding holder 31 and a slit divider 32 inclinedly extended from an inlet end 311 of the tubular guiding holder 31 to form a conical inserter head 321. Preferably, the slit divider 32 is approximately 15 to 35 degrees inclined from guiding holder 31.

Figure 2:
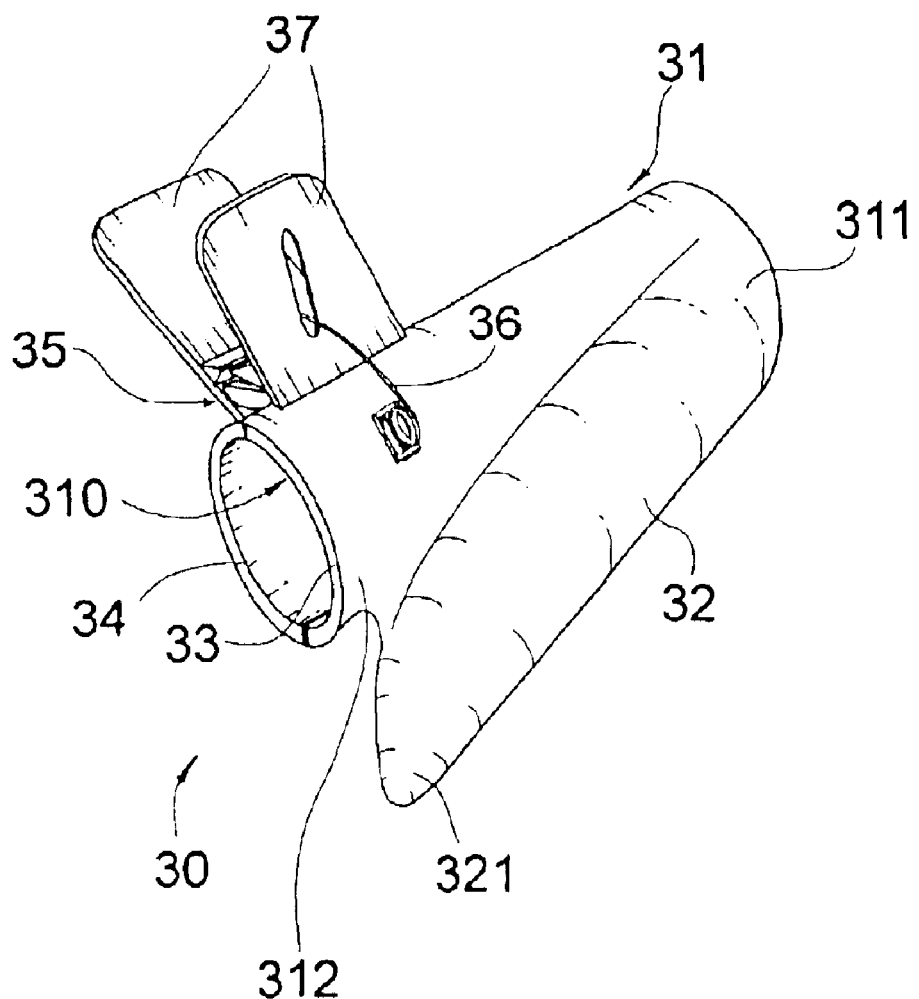
FIG. 2 is a perspective view illustrating a cable guider of the cable organizer according to the above preferred embodiment of the present invention.

Referring to FIG. 1 and FIG. 2, the guiding holder 31 is arranged to hold around a length portion of the cables 22 and slide along the length of the cables 22. The slit divider 32 is constructed to be able to insert in the holding sleeve 12 from one of the first and second openings 122 or 123 thereof and slide through the cable channel 121 to the other opening 122 or 123 in such a manner that when the slit divider 32 slides through the cable channel 121 of the holding sleeve 12, the inlet end 311 of the guiding holder 31 is positioned inside the cable channel 121, as shown in FIG. 1.

Therefore, when the guiding holder 31 slides from a previous length portion to a current length portion along the length of the cables 22 while the slit divider 32 is sliding through the cable channel 121, the previous length portion of the cables 22 will be placed inside the cable channel 121 of the holding sleeve 12 so that the length of the cables 22 which equals to the length of the holding sleeve 12 can be easily placed inside the holding sleeve 12 along the cable channel 121 by simply running the slit divider 32 of the cable guider 32 through the cable channel 121 of the holding sleeve 12.

Figure 3:
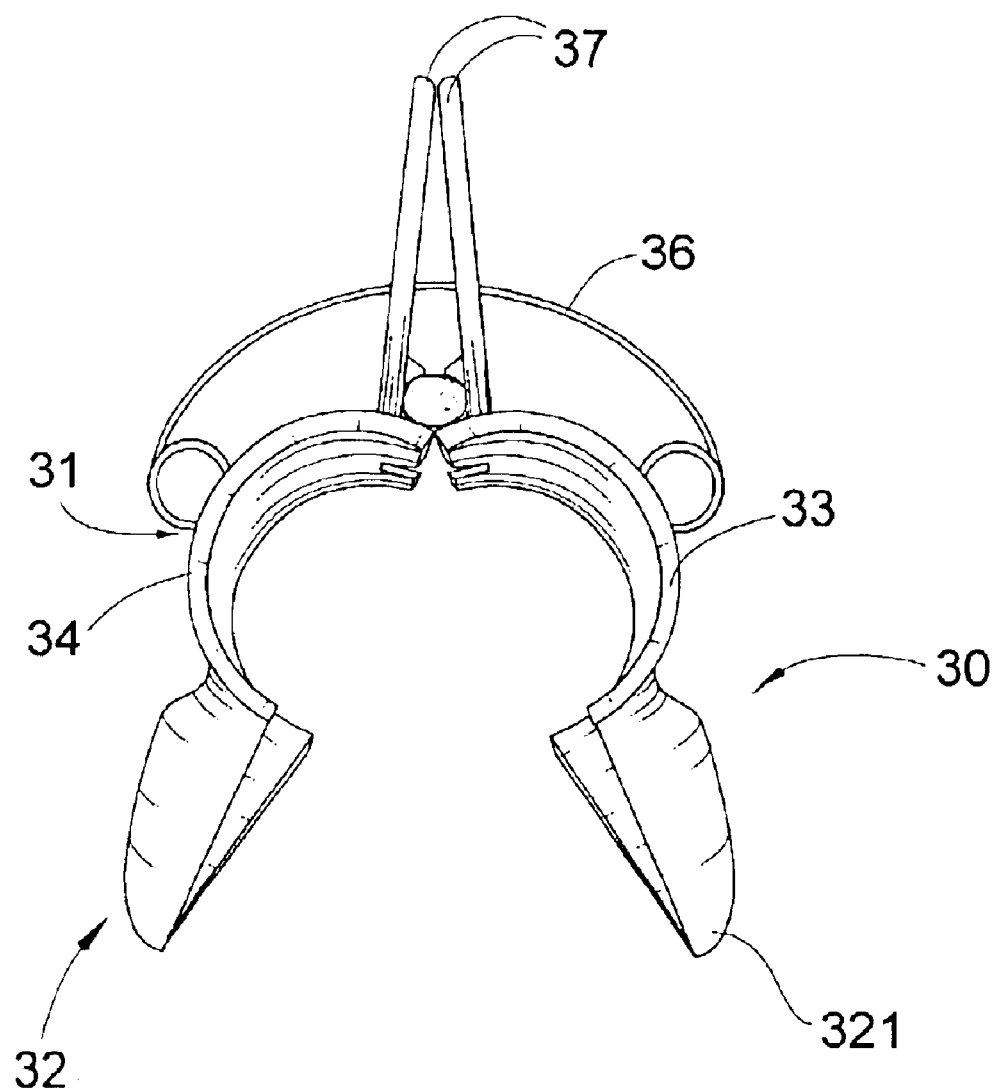
FIG. 3 is an end view of the cable guider of the cable organizer according to the above preferred embodiment of the present invention.

Accordingly, referring to FIG. 1 and FIG. 2, the cable guider 30 is a specially designed tool that is used to engage the cables 22 into the holding sleeve 12. The cable guider 30 is composed of two symmetrical halves, i.e. a pair of semicircular opposing shells 33, 34. Each of the opposing shells 33, 34 comprises an upper portion forming one half of the guiding holder 31 and a lower portion forming one half of the slit divider 32, so that when the pair opposing shells 33, 34 are pivotally hinged edge to edge together by means of a hinge device 35, the two halves of the guiding holder 31 and the two halves of the slit divider 32 are combined to form the guiding holder 31 and the slit divider 32 respectively. The cable guider 30 further includes a retaining means 36 for normally retaining the opposing shells 33, 34 together, i.e. maintaining the cable guider 30 in a closed condition, until a separating force is applied to open the guiding holder 31 by separating the opposing shells 33, 34 about the hinge device 35, as shown in FIG. 3. When the separating force is released, the retaining means 36 will close up the two opposing shells 33, 34 automatically, as shown in FIG. 2.

According to the preferred embodiment, the cable guider 30 further comprises a pair of handles 37 integrally protruded from the two halves of guiding holder 31 and the retaining means 36 is a C-shape spring having two ends biased against the two halves of the guiding holder 31 and penetrating through the pair of handles 37, so that when the two handles 37 are pressed towards each other, the two opposing shells 33, 34 hingedly open a bout the hinge device 3 5 provided at the roots of the two handles 3 7 t o c lamp around a bundle of cables 22 and to stretch out the C-shaped spring 36, as shown in FIG. 3. When the compression force applied to the two handles 37 is released, the C-shape spring presses the two opposing shells 33, 34 to hingedly close about the hinge device 35 so as to hold the bundle of cables 22 in position, as shown in FIGS. 1 and 2.

As shown in FIGS. 1 and 2, when the two opposing shells 33, 34 are closed together, the guiding holder 31 substantially forms a cable conduit 310 having two ends functioning as the inlet end 311 and a guiding end 312. The inserter head 321 serves as a leading part for the cable guider 30 to enter the first or second opening 122, 123 of holding sleeve 12.

Figure 4:
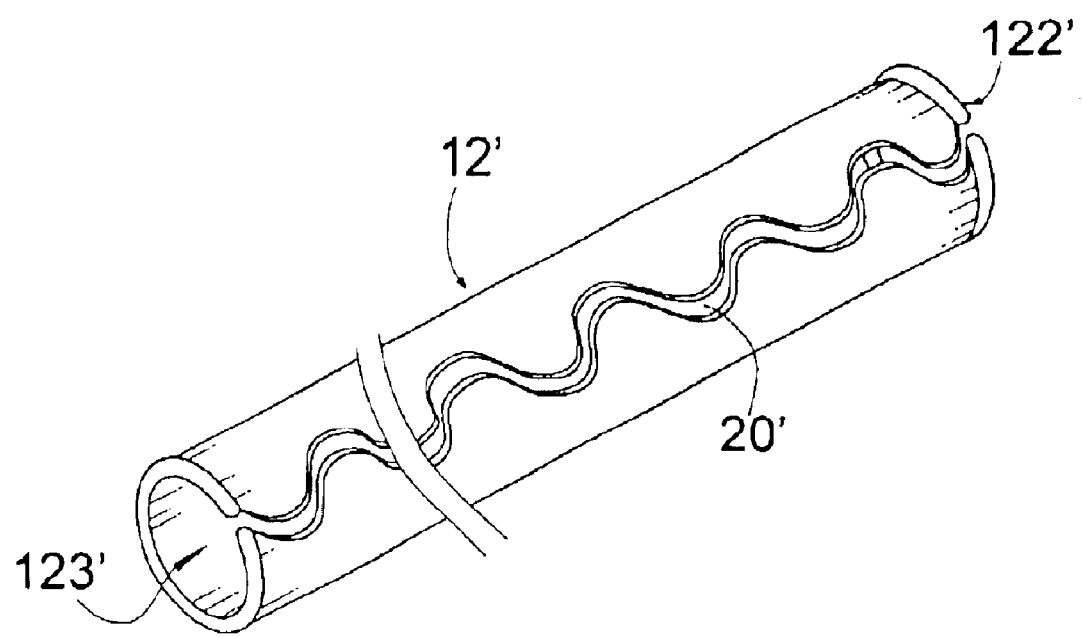
FIG. 4 is a perspective view illustrating an alternative mode of the cable organizer according to the above preferred embodiment of the present invention.

Referring to FIG. 4, an alternative mode of the holding sleeve 12' is shown in detail according to above preferred embodiment of the present invention. The holding sleeve 12' has a continuous S-shape receiving slit 20' extending from a first opening 122' to a second opening 123' along a longitudinal side thereof Because the cables placed within the holding sleeve 12' are not likely to meet the curve of the receiving slit 20', they would not easily escape the confinement of the holding sleeve 12'. It is noted that the cables may be push into the holding sleeve 12' with assistance of the cable guider 30 as shown in FIGS. 2 and 3.

The present invention has certain advantages over the conventional solutions to organization of cables. First, the holding sleeve 12 is capable of applying to the cables that arc already plugged into sockets. Because the cables can be engaged into the holding sleeve 12 via the receiving slit 20, it saves troubles and hassles of trying to work cables through the holding sleeve 12 from the first opening 122 to the second opening 123. Second, the nonlinear receiving slit 20 has the advantage of preventing the cables from escaping the confinement of the holding sleeve 12, while keeping it convenient to separate them simply by pulling them a part with hands. Moreover, when the holding sleeve 12 is used together with the cable guide 30, the whole process of organization of cables can be done in seconds by clipping cables with the cable guide 30, engaging the cable guider 30 with the holding sleeve 12, and moving the cable guider 30 through the holding sleeve 12. When the process is done, the holding sleeve 12 will give the cables better protection and a neater looking for purposes of beauty.

One skilled in the art will understand that the embodiment of the present invention as shown in the drawings and described above is exemplary only and not intended to be limiting. It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A cable organizer comprising a holding sleeve for holding one or more cables therein, wherein said holding sleeve which is an elongated tubular body made of elastic material having a first opening at one end and a second opening at another end defining a cable channel between said first and second openings, wherein said holding sleeve further has a nonlinear receiving slit continuously extended from said first opening to said second opening so as to define a plurality of pairs of holding arms along said receiving slit, wherein by separating said holding arms, a size of said cable channel is enlarged and a width of said receiving slit is flexibly widened for receiving the cables into said holding sleeve, whereby after the cables are placed therein, said holding arms automatically return to original positions thereof to close up said receiving slit for preventing the cables from escaping said holding sleeve.

2. The cable organizer, as recited in claim 1, wherein a first set of C-shaped slots is formed spacedly and parallelly along a front side of said holding sleeve longitudinally wherein said receiving slit incorporates with said first set of C-shaped slots to define said zigzag shape thereof, wherein between every two C-shaped slots of said first set of said C-shaped slots, said respective pair of holding arms is formed.

3. The cable organizer, as recited in claim 2, wherein one of said holder arms is longer than another said holding arm.

4. The cable organizer, as recited in claim 2, wherein a second set of C-shaped slots is spacedly and parallelly along a front side of said holding sleeve longitudinally, wherein said first and second sets of C-shaped slots are arranged intervally to maintain a whole and continuous body.

5. The cable organizer, as recited in claim 3, wherein a second set of C-shaped slots is spacedly and parallelly along a front side of said holding sleeve longitudinally, wherein said first and second sets of C-shaped slots are arranged intervally to maintain a whole and continuous body.

6. The cable organizer, as recited in claim 1, further comprises a cable guider for gathering the cables and inserting the cables into said cable channel by slidably running through said holding sleeve.

7. The cable organizer, as recited in claim 2, further comprises a cable guider for gathering the cables and inserting the cables into said cable channel by slidably running through said holding sleeve.

8. The cable organizer, as recited in claim 3, further comprises a cable guider for gathering the cables and inserting the cables into said cable channel by slidably running through said holding sleeve.

9. The cable organizer, as recited in claim 4, further comprises a cable guider for gathering the cables and inserting the cables into said cable channel by slidably running through said holding sleeve.

10. The cable organizer, as recited in claim 5, further comprises a cable guider for gathering the cables and inserting the cables into said cable channel by slidably running through said holding sleeve.

11. The cable organizer, as recited in claim 6, wherein said cable guider includes a tubular guiding holder and a slit divider inclinedly extended from an inlet end of said tubular guiding holder to form a conical inserter head, wherein said slit divider is constructed to be able to insert in said holding sleeve from one of said first and second openings thereof and slide through said cable channel to said other opening in such a manner that when said slit divider slides through said cable channel of said holding sleeve, said inlet end of said guiding holder is positioned inside said cable channel.

12. The cable organizer, as recited in claim 7, wherein said cable guider includes a tubular guiding holder and a slit divider inclinedly extended from an inlet end of said tubular guiding holder to form a conical inserter head, wherein said slit divider is constructed to be able to insert in said holding sleeve from one of said first and second openings thereof and slide through said cable channel to said other opening in such a manner that when said slit divider slides through said cable channel of said holding sleeve, said inlet end of said guiding holder is positioned inside said cable channel.

13. The cable organizer, as recited in claim 8, wherein said cable guider includes a tubular guiding holder and a slit divider inclinedly extended from an inlet end of said tubular guiding holder to form a conical inserter head, wherein said slit divider is constructed to be able to insert in said holding sleeve from one of said first and second openings thereof and slide through said cable channel to said other opening in such a manner that when said slit divider slides through said cable channel of said holding sleeve, said inlet end of said guiding holder is positioned inside said cable channel.

14. The cable organizer, as recited in claim 9, wherein said cable guider includes a tubular guiding holder and a slit divider inclinedly extended from an inlet end of said tubular guiding holder to form a conical inserter head, wherein said slit divider is constructed to be able to insert in said holding sleeve from one of said first and second openings thereof and slide through said cable channel to said other opening in such a manner that when said slit divider slides through said cable channel of said holding sleeve, said inlet end of said guiding holder is positioned inside said cable channel.

15. The cable organizer, as recited in claim 10, wherein said cable guider includes a tubular guiding holder and a slit divider inclinedly extended from an inlet end of said tubular guiding holder to form a conical inserter head, wherein said slit divider is constructed to be able to insert in said holding sleeve from one of said first and second openings thereof and slide through said cable channel to said other opening in such a manner that when said slit divider slides through said cable channel of said holding sleeve, said inlet end of said guiding holder is positioned inside said cable channel.

16. The cable organizer, as recited in claim 11, wherein said cable guider is made of a pair of opposing shells each comprising an upper portion forming one half of said guiding holder and a lower portion forming one half of said slit divider, wherein said pair opposing shells are pivotally hinged edge to edge together by means of a hinge device and thus said two halves of said guiding holder and said two halves of said slit divider are combined to form said guiding holder and said slit divider respectively, wherein said cable guider further includes a retaining means for normally retaining said opposing shells together so as to maintain said cable guider in a closed condition until a separating force is applied to open said guiding holder by separating said opposing shells about said hinge device, wherein when said separating force is released, said retaining means closes up said two opposing shells automatically, wherein when said two opposing shells are closed together, said guiding holder substantially forms a cable conduit having two ends functioning as said inlet end and a guiding end and said inserter head serves as a leading part for said cable guider to enter said first or second opening of holding sleeve.

17. The cable organizer, as recited in claim 12, wherein said cable guider is made of a pair of opposing shells each comprising an upper portion forming one half of said guiding holder and a lower portion forming one half of said slit divider, wherein said pair opposing shells are pivotally hinged edge to edge together by means of a hinge device and thus said two halves of said guiding holder and said two halves of said slit divider are combined to form said guiding holder and said slit divider respectively, wherein said cable guider further includes a retaining means for normally retaining said opposing shells together so as to maintain said cable guider in a closed condition until a separating force is applied to open said guiding holder by separating said opposing shells about said hinge device, wherein when said separating force is released, said retaining means closes up said two opposing shells automatically, wherein when said two opposing shells are closed together, said guiding holder substantially forms a cable conduit having two ends functioning as said inlet end and a guiding end and said inserter head serves as a leading part for said cable guider to enter said first or second opening of holding sleeve.

18. The cable organizer, as recited in claim 13, wherein said cable guider is made of a pair of opposing shells each comprising an upper portion forming one half of said guiding holder and a lower portion forming one half of said slit divider, wherein said pair opposing shells are pivotally hinged edge to edge together by means of a hinge device and thus said two halves of said guiding holder and said two halves of said slit divider are combined to form said guiding holder and said slit divider respectively, wherein said cable guider further includes a retaining means for normally retaining said opposing shells together so as to maintain said cable guider in a closed condition until a separating force is applied to open said guiding holder by separating said opposing shells about said hinge device, wherein when said separating force is released, said retaining means closes up said two opposing shells automatically, wherein when said two opposing shells are closed together, said guiding holder substantially forms a cable conduit having two ends functioning as said inlet end and a guiding end and said inserter head serves as a leading part for said cable guider to enter said first or second opening of holding sleeve.

19. The cable organizer, as recited in claim 14, wherein said cable guider is made of a pair of opposing shells each comprising an upper portion forming one half of said guiding holder and a lower portion forming one half of said slit divider, wherein said pair opposing shells are pivotally hinged edge to edge together by means of a hinge device and thus said two halves of said guiding holder and said two halves of said slit divider are combined to form said guiding holder and said slit divider respectively, wherein said cable guider further includes a retaining means for normally retaining said opposing shells together so as to maintain said cable guider in a closed condition until a separating force is applied to open said guiding holder by separating said opposing shells about said hinge device, wherein when said separating force is released, said retaining means closes up said two opposing shells automatically, wherein when said two opposing shells are closed together, said guiding holder substantially forms a cable conduit having two ends functioning as said inlet end and a guiding end and said inserter head serves as a leading part for said cable guider to enter said first or second opening of holding sleeve.

20. The cable organizer, as recited in claim 15, wherein said cable guider is made of a pair of opposing shells each comprising an upper portion forming one half of said guiding holder and a lower portion forming one half of said slit divider, wherein said pair opposing shells are pivotally hinged edge to edge together by means of a hinge device and thus said two halves of said guiding holder and said two halves of said slit divider are combined to form said guiding holder and said slit divider respectively, wherein said cable guider further includes a retaining means for normally retaining said opposing shells together so as to maintain said cable guider in a closed condition until a separating force is applied to open said guiding holder by separating said opposing shells about said hinge device, wherein when said separating force is released, said retaining means closes up said two opposing shells automatically, wherein when said two opposing shells are closed together, said guiding holder substantially forms a cable conduit having two ends functioning as said inlet end and a guiding end and said inserter head serves as a leading part for said cable guider to enter said first or second opening of holding sleeve.

21. The cable organizer, as recited in claim 16, wherein said cable guider further comprises a pair of handles integrally protruded from said two opposing shells of guiding holder and said retaining means is a C-shape spring having two ends biased against said two halves of said guiding holder and penetrating through said pair of handles, wherein when said two handles are pressed towards each other, said two opposing shells hingedly open about said hinge device provided at roots of said two handles for clamping around the cables and stretch out said C-shaped spring, wherein when a compression force applied to said two handles is released, said C-shape spring presses said two opposing shells to hingedly close about said hinge device for holding the cables in position.

22. The cable organizer, as recited in claim 17, wherein said cable guider further comprises a pair of handles integrally protruded from said two opposing shells of guiding holder and said retaining means is a C-shape spring having two ends biased against said two halves of said guiding holder and penetrating through said pair of handles, wherein when said two handles are pressed towards each other, said two opposing shells hingedly open about said hinge device provided at roots of said two handles for clamping around the cables and stretch out said C-shaped spring, wherein when said a compression force applied to said two handles is released, said C-shape spring presses said two opposing shells to hingedly close about said hinge device for holding the cables in position.

23. The cable organizer, as recited in claim 18, wherein said cable guider further comprises a pair of handles integrally protruded from said two opposing shells of guiding holder and said retaining means is a C-shape spring having two ends biased against said two halves of said guiding holder and penetrating through said pair of handles, wherein when said two handles are pressed towards each other, said two opposing shells hingedly open about said hinge device provided at roots of said two handles for clamping around the cables and stretch out said C-shaped spring, wherein when a compression force applied to said two handles is released, said C-shape spring presses said two opposing shells to hingedly close about said hinge device for holding the cables in position.

24. The cable organizer, as recited in claim 19, wherein said cable guider further comprises a pair of handles integrally protruded from said two opposing shells of guiding holder and said retaining means is a C-shape spring having two ends biased against said two halves of said guiding holder and penetrating through said pair of handles, wherein when said two handles are pressed towards each other, said two opposing shells hingedly open about said hinge device provided at roots of said two handles for clamping around the cables and stretch out said C-shaped spring, wherein when a compression force applied to said two handles is released, said C-shape spring presses said two opposing shells to hingedly close about said hinge device for holding the cables in position.

25. The cable organizer, as recited in claim 20, wherein said cable guider further comprises a pair of handles integrally protruded from said two opposing shells of guiding holder and said retaining means is a C-shape spring having two ends biased against said two halves of said guiding holder and penetrating through said pair of handles, wherein when said two handles are pressed towards each other, said two opposing shells hingedly open about said hinge device provided at roots of said two handles for clamping around the cables and stretch out said C-shaped spring, wherein when a compression force applied to said two handles is released, said C-shape spring presses said two opposing shells to hingedly close about said hinge device for holding the cables in position.

* * * * *